United States Patent [19]

Johnston et al.

[11] 4,103,926
[45] Aug. 1, 1978

[54] CONVERTIBLE BOAT-UTILITY TRAILER

[75] Inventors: Charles Richard Johnston; James G. MacGregor, both of Wilmington, N.C.

[73] Assignee: Consolidated Energy Products Co., Wilmington, N.C.

[21] Appl. No.: 794,961

[22] Filed: May 9, 1977

[51] Int. Cl.² .................................................. B60P 3/10
[52] U.S. Cl. ............................ 280/414 R; 193/35 SS; 214/84; 296/10
[58] Field of Search ........... 280/414 R; 296/10, 23 B; 214/84; 193/35 SS; 9/1.2

[56] References Cited

U.S. PATENT DOCUMENTS

| | | | |
|---|---|---|---|
| 2,468,925 | 5/1949 | DeBoer | 214/84 X |
| 3,058,756 | 10/1962 | Holsclaw | 280/414 R |
| 3,294,263 | 12/1966 | Naden et al. | 214/84 |
| 3,339,762 | 9/1967 | Fox | 214/84 |
| 3,584,753 | 6/1971 | Voeller | 280/414 R |

Primary Examiner—John A. Pekar

[57] ABSTRACT

A trailer construction that provides an unobstructed flat bed having opposite side walls and hinged or removable front and rear gates as well as adjusting and retracting keel and chine rollers for converting the flat bed of the utility trailer into a boat trailer.

9 Claims, 12 Drawing Figures

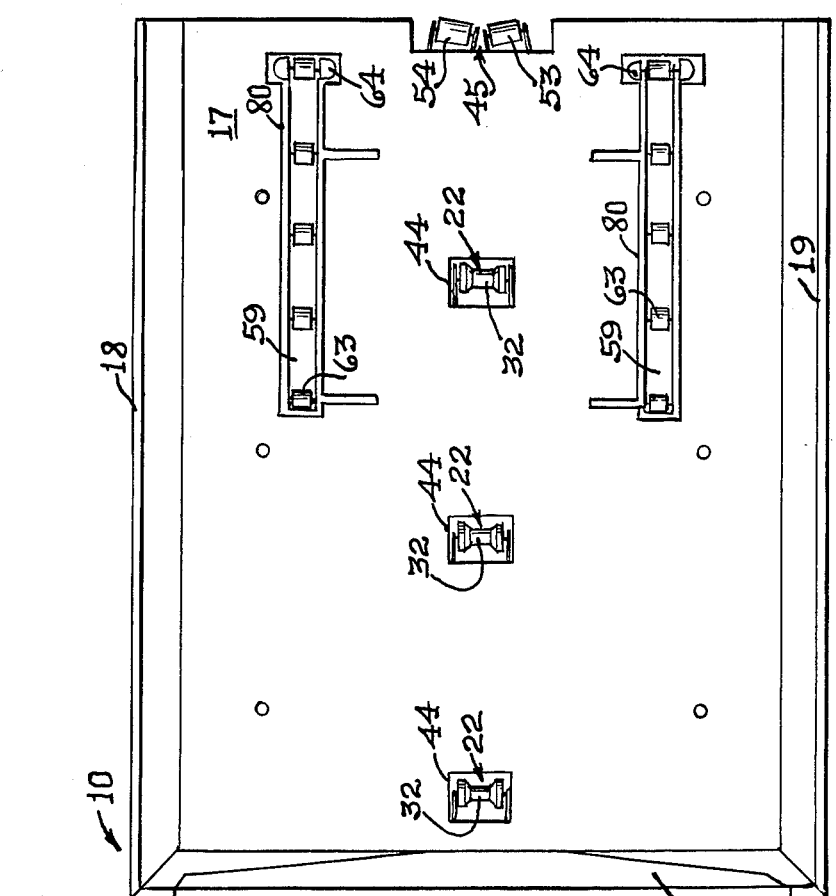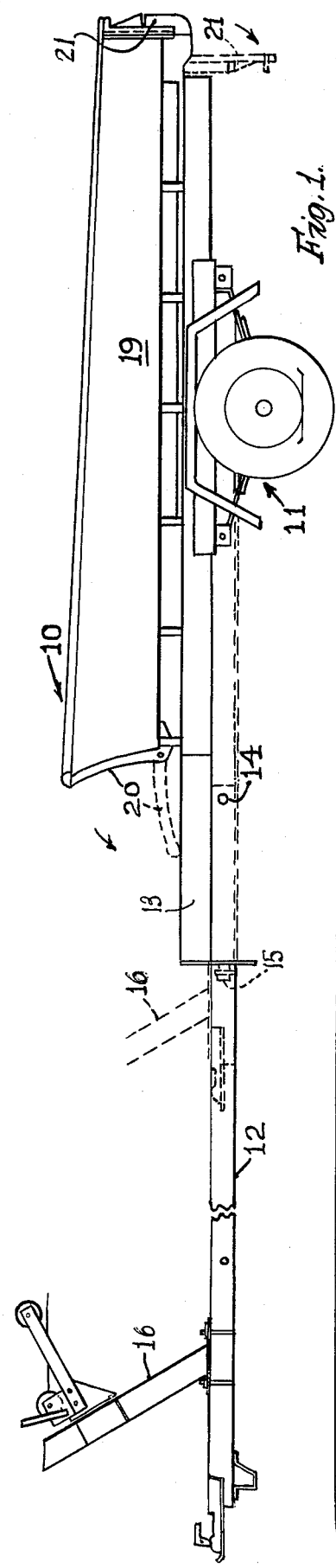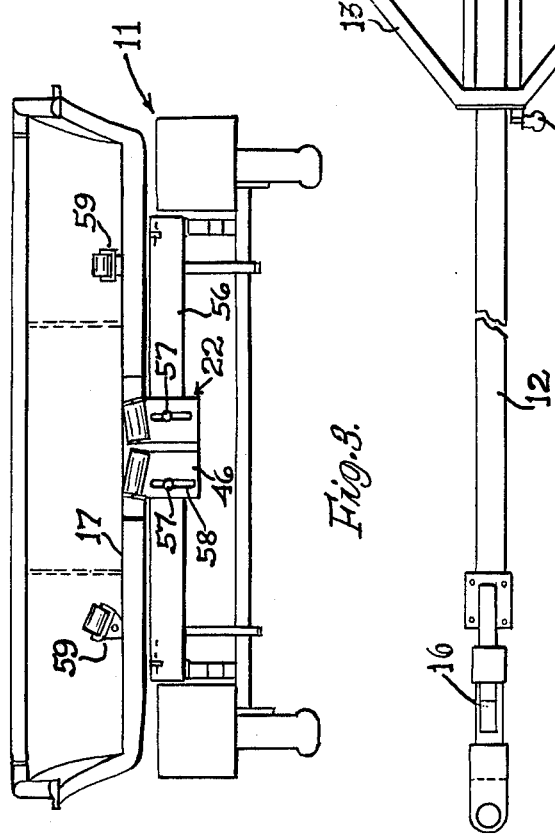

ized as
CONVERTIBLE BOAT-UTILITY TRAILER

SUMMARY OF THE INVENTION

A convertible trailer structure that may be util an all-purpose flat bed carryall and a boat trailer.

As a boat trailer, there is provided an adjustable boat trailer centering rear keel roller, as well as a pair of chine roller trays and a series of aligned keel rollers, all of which are readily retractable beneath the flat bed surface of the trailer when not in use as a boat trailer.

The chine and keel rollers are all provided with indexing quadrants and cooperating indexing keys for simply yet efficiently adjusting and positioning all of the rollers relative to a boat hull for securing the same within the trailer. The adjusting feature permits the parts to be retracted into unobstructing position so that the same may be used as a utility carryall. By various adjustments of the rollers, the trailer may accommodate boats of various sizes and configurations.

GENERAL DESCRIPTION

The invention will be best understood by reference to the accompanying drawings which show the preferred form of construction by which the objects of the invention are achieved, and in which:

FIG. 1 is a side elevational view of the boat trailer showing certain parts in dotted lines in adjusted positions;

FIG. 2 is a top plan view of the trailer;

FIG. 3 is a rear elevational view of the trailer with the tail gate removed;

Figures 4, 5:
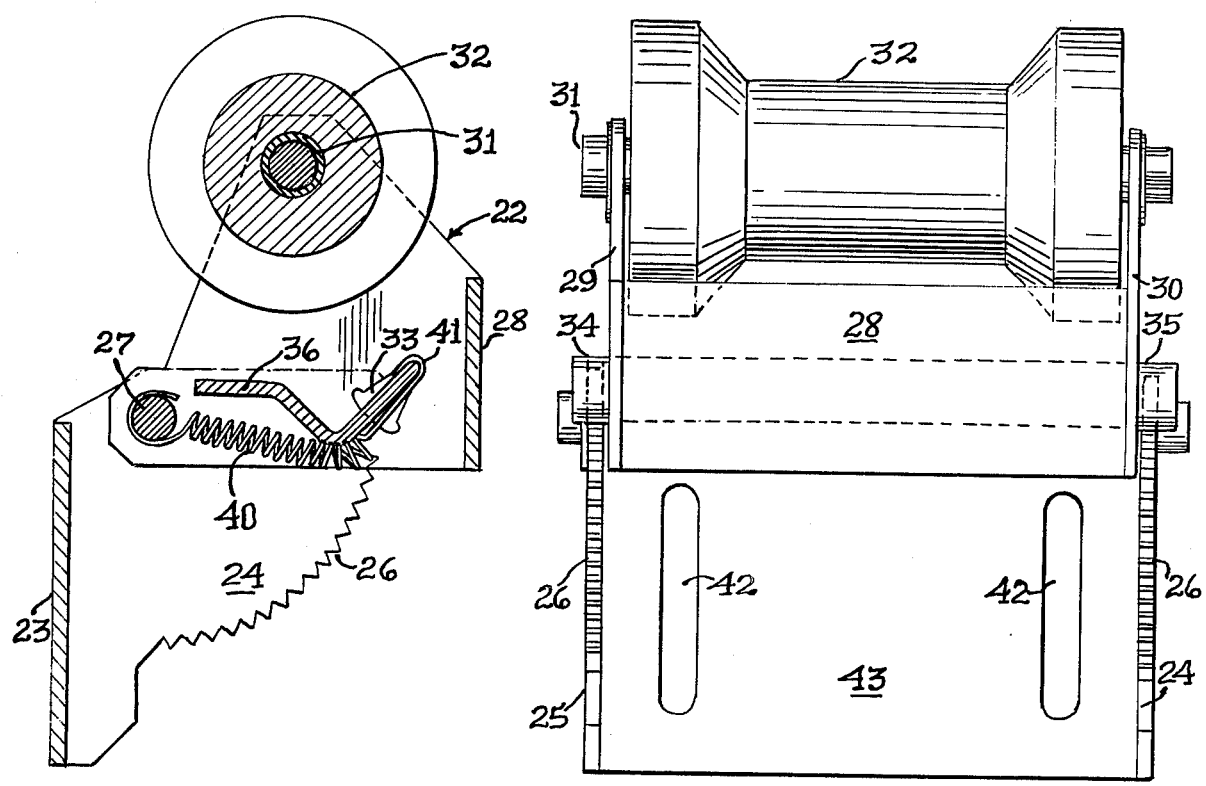
FIG. 4 is a side elevational detail sectional view of a keel roller.
FIG. 5 is a front elevational view of a keel roller.

The convertible boat-utility trailer 10 of this invention includes a wheeled undercarriage 11 which provides at the forward end a telescoping tow tongue 12. Through the provision of a forwardly projecting yoke 13 which is pivotally connected to the two tongue 12 by a pivot pin 14, as well as a manually operated tilt latch 15, the undercarriage 11 may be released from the tow tongue 12 and pivot about the axis of the wheel support therefor, all in a manner well known in the art. The telescoping tow tongue 12 also provides an adjustable winch stanchion 16 at its forward end, as shown.

The wheeled undercarriage 11 supports a flat bed 17 provided with vertical side walls 18 and 19. There is also provided a front wall 20 which may be pivoted about a horizontal axis in any suitable manner such as shown in dotted lines in FIG. 1, as well as a tail gate 21 which also may be pivotally connected to the undercarriage 11 or adapted for complete removal therefrom in any suitable manner. As, such a description of the above identified components applies to a flat bed utility carry-all type trailer which may be susceptible of many and varying uses.

Figures 6, 8:
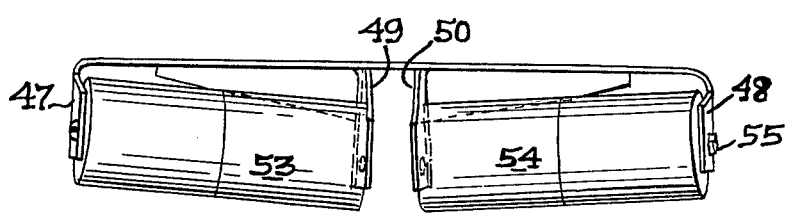
FIG. 6 is a plan view of the indexing latch key as used with the keel roller of FIGS. 4 and 5.
FIG. 8 is a top plan view of the rear keel roller used in this invention.

To convert the trailer to a boat-hauling trailer, there is provided a series of retractile keel roller assemblies 22, which are shown in FIGS. 2, 3, 4 and 5. Specifically, one of the keel roller assemblies 22 is shown in FIGS. 4, 5 and 6.

The keel roller assembly 22 includes a U-shaped mounting bracket 23. This mounting bracket 23 provides a pair of side walls 24 and 25, a portion of which is arcuated and has formed on the peripheral edge thereof a series of teeth 26.

By a pin 27 journalled through the side walls 24 and 25, there is pivotally mounted a second U-shaped bracket 28 having side walls 29 and 30. The bracket 28, by a shaft 31 journalled between the side walls 29 and 30, rotatably supports a keel roller 32. Formed in each of the side walls 29 and 30 is a key slot 33. These key slots 33 are adapted to freely receive the opposite reduced ends 34 and 35 of the indexing latch key 36 (See FIG. 6). The end portions 34 and 35 of the latch key 36 are adapted to extend beyond the side walls 29 and 30 of the bracket 28 and provide knife edges 37 which are adapted to engage the teeth 26 provided by each of the side walls 24 and 25 of the mounting bracket 23, so as to maintain the U-shaped bracket 28 and the keel roller 32 in any adjusted pivotal position relative to its mounting pin 27.

The latch key 36 provides shoulders 38 which bear upon the inner wall surfaces of the side walls 29 and 30 of the U-shaped bracket 28 adjacent to the key slots 33 formed therein, so as to maintain the latch key 36 in its desired position relative to the side walls 24 and 25 of the mounting bracket 23. An operating finger 39 is provided whereby the latch key 36 may be manually moved through the key slots 33 so as to dispose the knife edges 37 provided thereby in a counterclockwise direction as seen in FIG. 4, out of contact with the teeth 26 of the side walls 24 and 25 of the mounting bracket 23, so that the U-shaped bracket together with the roller 32, may be adjustably moved through the indexing quadrant provided by such side walls of the mounting bracket 23.

To maintain the latch key 36 in a latching position, yet yieldable so as to be pivoted to a released position, there is provided a coil spring 40, one end of which engages the pin 27 and the opposite end 41 of which engages a portion of the latch key 36, as shown in FIG. 4.

Each of these retractile keel roller assemblies 22 is mounted to a frame structure of the undercarriage 11 by having suitable connectors (not shown) projected through slots 42 formed in the rear wall 43 of the mounting bracket 23. The keel rollers 32 are adapted to be moved into their raised or operative position, as shown in FIGS. 4 and 5, wherein they will project upwardly through openings 44 formed in the flat bed 17 of the trailer 10.

Figure 7:
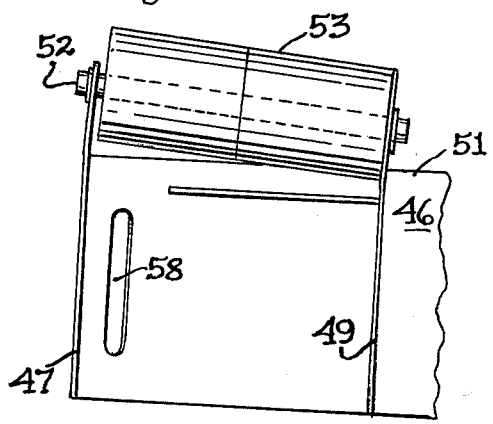
FIG. 7 is a fragmentary front elevational view of the rear keel roller.

Cooperating with the retractile keel roller assemblies 22 is a rear keel roller group 45. The rear keel rollers are shown in FIGS. 7 and 8 and, as such, include a mounting plate 46 which provides end walls 47 and 48 as well as a pair of spaced intermediate walls 49 and 50. The walls 47 through 50 are of a length so as to project beyond the upper edge 51 of the mounting plate 46, with the upper ends of the walls 47 and 49 being of different lengths and being bent out of the normal plane of their side walls so that when a shaft 52 is journalled therebetween, it will support a roller 53 in a cocked position with respect to the mounting plate 46. The other pair of walls 48 and 50 have their free ends bent out of the normal plane in a direction opposite to that of the free ends of the side walls 47 and 49, so that a roller 54 supported on a shaft 55 extended therebetween, will be cocked to lie in a bisecting plane with respect to the roller 53. This is clearly shown in FIGS. 2 and 8.

The rear keel roller group 45 is mounted to the rear sill 46 of the undercarriage 11 by a series of connectors 56 and 57 projecting through slots 58 formed in the mounting plate 46. By this arrangement the rear keel roller group may be raised or lowered so as to coact with the retractile keel roller assemblies 22 when the trailer is adapted to accommodate a boat or the like.

One of the major problems in boat trailers is maintaining a boat centered upon the trailer during loading and unloading. To assist the keel supporting rollers, as heretofore described, there is provided a pair of adjustable trays of chine rollers.

Figures 9, 10:
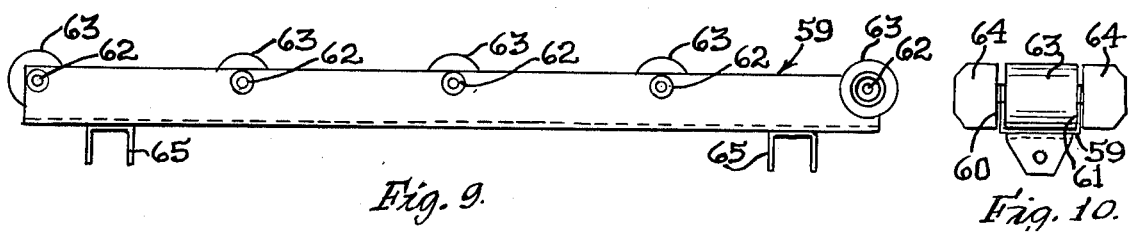
FIG. 9 is a side elevational view of one of the trays for the chine rollers.
FIG. 10 is a front elevational view of the tray of chine rollers of FIG. 9.

As shown in FIG. 9, the tray 59 is generally U-shaped and provides opposite side walls 60 and 61 between which are journalled a series of shafts 62, all of which in turn rotatably support a chine roller 63.

It should be noted that in FIGS. 9 and 10, the so-called first chine roller also includes a pair of guide rollers 64 mounted outboard of the side walls 60 and 61 of the tray 59. Mounted on the underside of the tray 59 are a pair of U-shaped brackets 65 which, by suitable nut and bolt assemblies 66, are connected to a support bar 67. The support bar 67 is part of the adjustable support for the tray 59 of the chine rollers 63.

Figure 11:
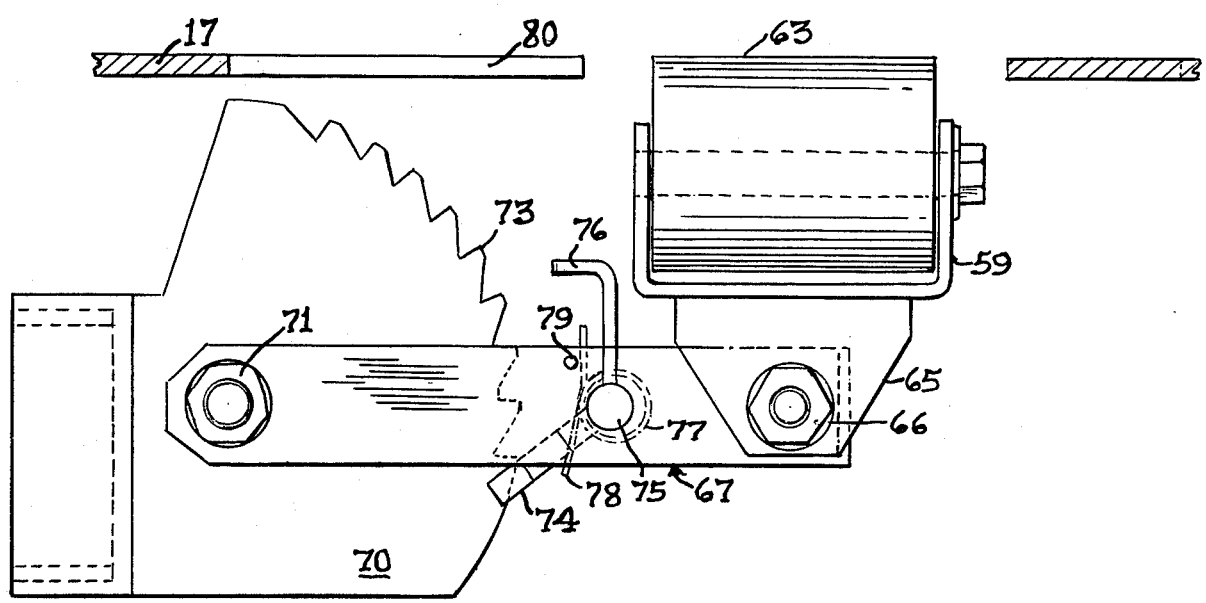
FIG. 11 is a side elevational view of the adjustable support for the chine roller tray.
Figure 12:
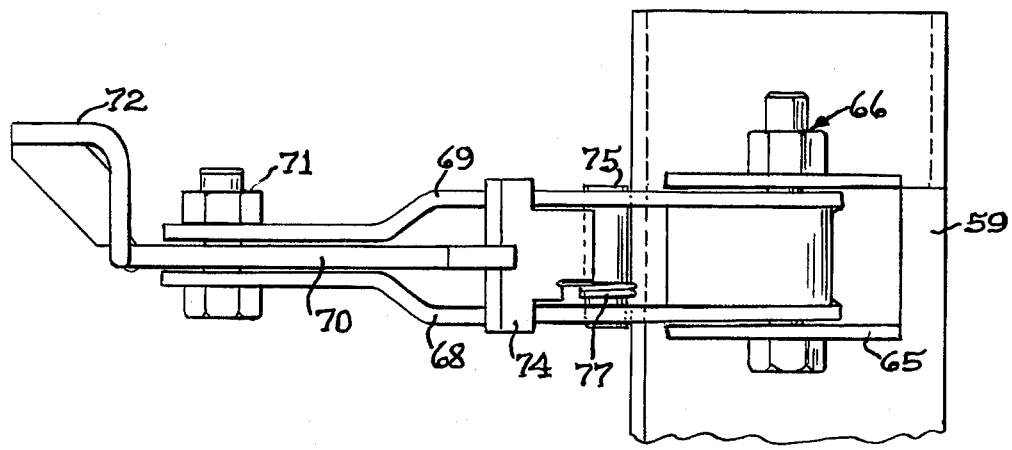
FIG. 12 is a fragmentary top plan view of the adjustable support of FIG. 11.

Referring to FIGS. 11 and 12, it is shown that the support bar 67 is made up of two identical bar members 68 and 69 which have corresponding ends adapted to lie in facial abutment to either side of an indexing bracket 70. As shown, the members 68 and 69 are pivotally connected to the bracket 70 by a loose nut and bolt assembly 71. The bracket 70, in turn, by an angle iron 72, is adapted to fixedly connect to a suitable frame member of the undercarriage 11 beneath the flat bed 17. The other ends of the bar members 68 and 69 are laterally offset so as to be spaced from each other and adapted to be disposed within the parallel side walls of the brackets 65.

The bracket 70 provides an arcuate toothed peripheral edge 73 which is adapted to be engaged by a latch bar 74 which radially extends from a pivot pin 75 journalled between the spaced bar members 68 and 69, as seen in FIGS. 11 and 12. Also radially extending from the pivot pin 75 is an angular latch finger 76. The latch bar 74 is adapted to be maintained in its latching contact with the teeth 73 of the bracket 70 by a coil spring 77, which embraces the pivot pin 75 and has one end 78 bearing against the latch bar 74, while the other end of the spring 77 is arrested by a stop pin 79. The chine roller tray 59 is adapted to be pivoted about the axis of the nut and bolt assembly 71 in a counterclockwise direction, as shown in FIG. 11, so as to project out of its associated opening 80 formed in the flat bed 17, to a position whereby all of the chine rollers carried by such tray will engage the chine of the boat hull when the keel of the boat hull has engaged and been rolled upon the keel rollers heretofore described. As shown in FIG. 3, the chine roller tray assemblies 59 have been partially pivoted so as to be positioned above the flat bed 17.

To release the chine roller trays 59 so that they may be disposed within or beneath the openings 80 formed in the flat bed 17, the latch finger 76 is engaged and caused to be pivoted in a counterclockwise direction, thereby releasing the latch bar 74 from engagement with any of the selected teeth 73 of the bracket 70, permitting the whole assembly to be pivoted in a clockwise direction about the axis of the nut and bolt assembly 71.

From the foregoing it is apparent that the chine roller trays 59 are adjustably positioned, as are the keel roller assemblies 22, not only relative to the flat bed 17, but also in relation to the form and configuration of the hull of a boat about to be positioned and centered on the trailer 10.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A convertible utility boat trailer having a wheeled undercarriage and a telescoping tow bar including
    (a) a utility carry-all flat bed supported on said undercarriage,
    (b) means for rollably supporting the keel of a boat upon said flat bed,
    (c) mounting brackets movably carried by said flat bed in selective openings formed therein for movably carrying said keel supporting means,
    (d) means for supporting the hull of a boat upon said flat bed and cooperating with said keel supporting means for centering the keel of the boat upon said flat bed,
    (e) mounting brackets carried by said flat bed in other selective openings for movably carrying said hull supporting means,
    (f) means for retracting said keel supporting means and said hull supporting means through the selective openings to a position beneath the plane of said flat bed when the trailer is used as a utility carry-all,
    (g) said retracting means including toothed indexing quadrants mounted on said flat bed beneath said selective openings and to which said mounting brackets are pivotally connected, and indexing keys carried by said mounting brackets and adapted to latch said keel supporting means and said hull mounting brackets in varying elevated positions relative to the normal plane of said flat bed so as to support and center a boat thereon.

2. A convertible utility boat trailer as defined by claim 1, wherein said means for rollably supporting the keel of a boat comprises a series of keel rollers spaced along the centerline of said flat bed and rotatably supported by their respective mounting brackets.

3. A convertible utility boat trailer as defined by claim 1, wherein said means for supporting the hull of a boat upon said flat bed comprises a series of chine rollers arranged in space parallel relation to either side of the centerline of said flat bed, and rotatably carried by their respective mounting brackets.

4. A convertible utility-boat trailer as defined by claim 3, wherein said chine roller supporting means comprises elongated trays adapted to provide rotatable support for said series of chine rollers, wherein a portion of each roller's periphery is exposed above said tray for contacting the hull of a boat to be centered upon said flat bed.

5. A convertible utility boat trailer as defined by claim 1, including yieldable means operatively connected to said indexing keys for mounting the same in latching contact with said toothed indexing quadrants.

6. A convertible utility-boat trailer having a wheeled undercarriage and a telescoping tow bar including
    (a) a utility carryall flat bed supported on said undercarriage,
    (b) a series of keel rollers spaced along the centerline of said flat bed for supporting the hull of a boat thereon,
    (c) mounting brackets for said keel rollers,
    (d) openings formed along the centerline of said flat bed through which said keel roller brackets are adapted to be moved into and out of an elevated position with respect to the normal plane of said flat bed,
    (e) fixed U-shaped mounting plates positioned in said openings beneath said flat bed with the side walls thereof providing toothed indexing quadrants,
    (f) means for pivotally connecting said keel roller mounting brackets to said U-shaped mounting plates,
    (g) indexing keys mounted on said keel roller mounting brackets and adapted to have releasable contact with said toothed indexing quadrants so as to releasably latch said keel roller mounting brackets and said keel rollers in a predetermined position relative to the normal plane of said flat bed,
    (h) a pair of chine roller supporting means to either side of the centerline of said flat bed,
    (i) a series of chine rollers mounted on each of said chine roller supporting means for contacting and centering the hull of a boat on said flat bed,
    (j) means movably supporting each of said chine roller supporting means,
    (k) a pair of openings formed in said flat bed to either side of said openings formed along the centerline of said flat bed through which said chine roller supporting means are adapted to be moved into an elevated position with respect to the normal plane of said flat bed, and
    (l) means for releasably latching said chine roller supporting means in a predetermined position with respect to the normal plane of said flat bed of said trailer.

7. A convertible utility-boat trailer having wheeled undercarriage and a telescoping tow bar as defined by claim 6 and including yieldable means connected to said indexing keys mounted on said keel roller mounting brackets for maintaining the same in latching contact with said toothed indexing quadrants so as to position said keel rollers in a predetermined position.

8. A convertible utility boat trailer as defined by claim 6 wherein said pair of chine roller supporting means comprise elongated trays adapted to provide rotatable support for said chine rollers, and further defined whereby said means for releasably latching said chine roller supporting means comprises fixed plates beneath said pair of openings formed in said flat bed with said plates providing a toothed indexing quadrant, and a means for pivotally connecting said trays to said toothed indexing quadrants and providing indexing keys having releasable contact with said toothed indexing quadrants so as to latch said trays and said chine rollers carried thereby in a predetermined position relative to the normal plane of said flat bed of said trailer.

9. A convertible utility-boat trailer as defined by claim 8 and including yieldable means connected to said indexing keys for maintaining the same in latching contact with said toothed indexing quadrants so as to position said keel rollers in a predetermined position.

* * * * *